Patented Nov. 29, 1927.

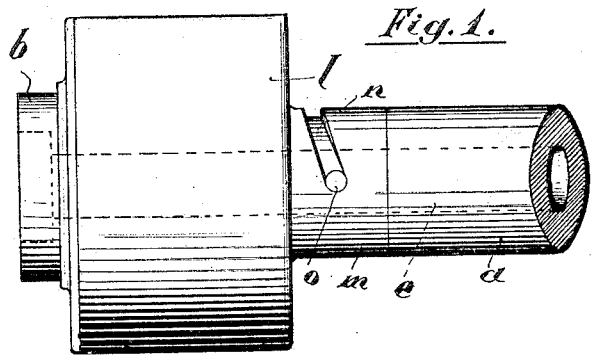
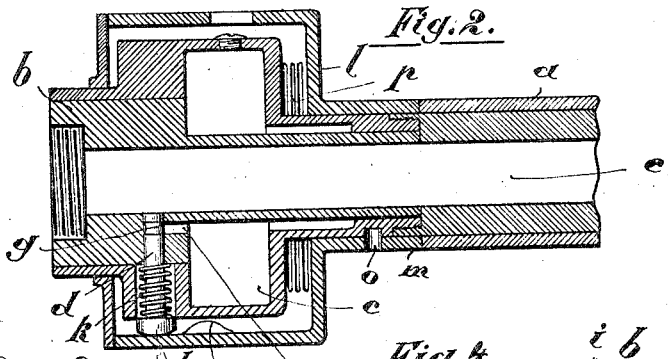
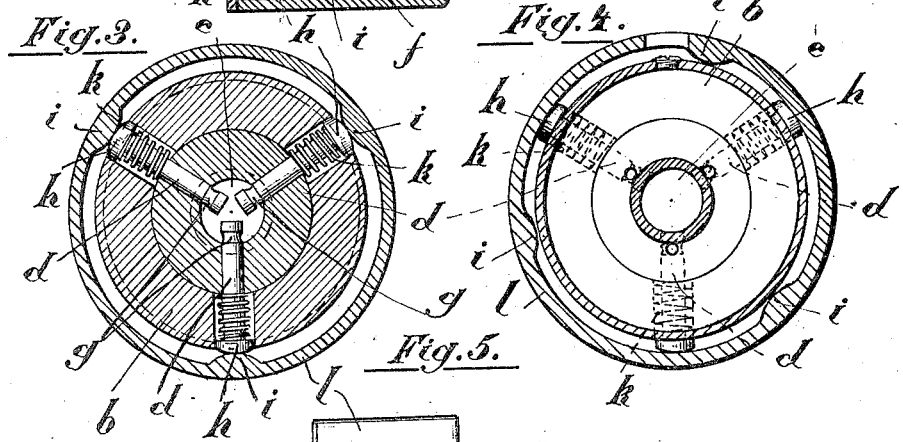
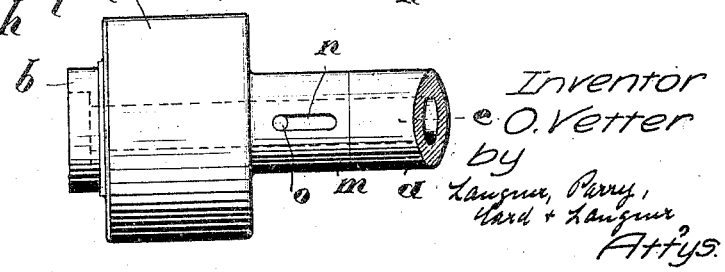

1,650,856

UNITED STATES PATENT OFFICE.

OTTO VETTER, OF STUTTGART, GERMANY.

DEVICE FOR LUBRICATING PNEUMATIC TOOLS.

Application filed March 6, 1924. Serial No. 697,375.

The present invention relates to a device for lubricating pneumatic tools, which device in spite of the high percussion and rotational speeds of such tools, ensures continuous and perfect lubrication, and also enables the amount of lubricant supplied to be regulated to some extent. Whereas the devices of this kind hitherto in use are built into the tool itself and therefore are only applicable when new tools are being constructed, the subject of the present invention—which is also distinguished by its simplicity and perfect working—can be introduced independently into the compressed air pipe concerned—a point of special importance in the case of all existing pipes. By means of this device an ample and controllable quantity of lubricant can then be continually exposed to the flow of compressed air, which transports it to the place to be lubricated.

The essence of the invention consists in that a certain quantity of the lubricant can be drawn out that is mechanically transported or carried out of a storage vessel by means of a movable member, for example a kind of piston, and by the displacement of this member is positively delivered into the current of compressed air, which then draws it away and carries it onward. The member is operated by hand, by pushing a wedge or cam under its head, this displacement of the piston being effected by moving the casing of the device. This movement may be axial, rotary or a combination of the two movements.

The subject of the present invention is illustrated in typical embodiments in the drawing, Fig. 1 is an external view of one embodiment of the device.

Fig. 2 is an axial section of same.

Figs. 3 and 4 are cross sections with the piston pushed home and drawn out.

Fig. 5 is an elevation of another embodiment.

The body $b$ of the device according to the present invention is attached to the compressed-air pipe $a$ and contains a chamber $c$ for the lubricant.

Adjoining this chamber $c$ is a member for example a kind of piston $d$, which, in the example shown, is mounted with its axis lying radially and is designed to be moved in a radial direction. This piston serves to transfer the lubricant into the compressed-air passage $e$. The piston $d$ might equally be adapted to move in another direction, for instance axially. For this purpose, the vessel $c$ containing the lubricant is connected by means of a passage $f$ with the path of the piston $d$, the latter being provided with a recess $g$. On the piston $d$ being pushed forward, the lubricant is conveyed thereby into the current of compressed air which draws it away and carries it onward.

The displacement of the piston $d$ is effected and rendered controllable by pushing a wedge or cam $i$ under the head $h$ of the piston $d$. The further the raised portion of the wedge or cam penetrates under the head $h$, the further is the piston $d$ pushed forward, and therefore the larger the quantity of lubricant rendered available to the compressed-air current. On the wedge $i$ being drawn back again, the piston spring $k$ automatically effects the return stroke of the piston.

The movement of the wedge or cam $i$ can be effected in any convenient manner, but, in any event, the casing $l$ of the device is employed for this purpose. In the embodiment shown in Fig. 1 the casing $l$ is twisted round and at the same time describes an axial movement, an oblique or spiral guide slot $n$ being provided in the sleeve $m$ of the casing, in which slot engages a fixed pin $o$ on the compressed-air pipe $a$. The casing $l$ is subjected to the action of a spring $p$, which, on the casing being released, turns it back automatically into its normal position.

The casing might equally well be arranged to describe a rotational movement alone, or also merely an axial movement in which latter case the slot $n$ is given an axial position.

I claim:—

1. A device for admitting lubricant to the column of fluid flowing in a conduit comprising, in combination with said conduit, an oil reservoir and an oil pump including a chamber communicating with the inside of said conduit and with said reservoir, and a mechanically actuated piston in said chamber for displacing a quantity of lubricant from said reservoir and delivering it into said conduit independently of pressure in said conduit, said piston acting as a cut-off valve to said reservoir upon the discharge stroke of said piston.

2. A device for admitting lubricant to the column of fluid flowing in a conduit, comprising, in combination with said conduit, an oil reservoir, and an oil pump including a chamber communicating with the inside of said conduit and with said reservoir, a mechanically actuated spring returned piston in said chamber for displacing a quantity of lubricant from said reservoir and delivering it to said conduit independently of pressure in said conduit, said piston acting as a cut-off valve to said reservoir upon the discharge stroke of said piston, and means for positively actuating said piston against the pressure of said spring.

3. A device for admitting lubricant to the column of fluid flowing in a conduit comprising, a member forming an oil reservoir surrounding said conduit, an oil pump, including a chamber communicating with the inside of said conduit and with said reservoir, and a piston in said chamber for forcing lubricant into said conduit, and a movable casing surrounding said reservoir having means engageable with said piston when said casing is moved for depressing said piston.

4. A device for admitting lubricant to the column of fluid flowing in a conduit comprising a member forming an oil reservoir surrounding said conduit, an oil pump including a chamber communicating with the inside of said conduit and with said reservoir, and a piston in said chamber for forcing lubricant into said conduit, said piston acting as a cut-off to said reservoir upon the discharge stroke of said piston, a reciprocable casing surrounding said reservoir having means engageable with said piston when said casing is moved in one direction for depressing said piston and a spring within said casing for returning it when released to its normal position.

5. A device for admitting lubricant to the column of fluid flowing in a conduit comprising a member forming an oil reservoir surrounding said conduit, an oil pump including a chamber communicating with the inside of said conduit and with said reservoir, and a piston in said chamber for forcing lubricant into said conduit, said piston acting as a cut-off valve to said reservoir upon a discharge stroke of said piston, and a reciprocable casing surrounding said reservoir having means engageable with said piston for depressing the latter, said casing and member having a pin and slot connection for transforming a rotating motion applied to said casing to a reciprocatory movement for depressing said piston, and a spring within said casing for returning it to normal released position.

In testimony whereof I affix my signature.

OTTO VETTER.